(12) United States Patent
Fiorilla et al.

(10) Patent No.: US 11,352,526 B2
(45) Date of Patent: Jun. 7, 2022

(54) LATERALLY-COILED ADHESIVELY-RETAINED LOW-FORCE BACKER FOR SEALANT APPLICATION

(71) Applicant: Schul International Co., LLC, Hudson, NH (US)

(72) Inventors: Nicholas A. Fiorilla, Hudson, NH (US); Michael M. Sebold, Cleveland Heights, OH (US)

(73) Assignee: Schul International Co., LLC, Hudson, NH (US)

( * ) Notice: Subject to any disclaimer, the term of this patent is extended or adjusted under 35 U.S.C. 154(b) by 65 days.

(21) Appl. No.: 17/094,559

(22) Filed: Nov. 10, 2020

(65) Prior Publication Data

US 2022/0145136 A1 May 12, 2022

(51) Int. Cl.
*C09J 7/26* (2018.01)
*C09J 7/38* (2018.01)
*B32B 27/40* (2006.01)
*B32B 5/18* (2006.01)
*B32B 7/06* (2019.01)
*B32B 7/12* (2006.01)

(52) U.S. Cl.
CPC .................. *C09J 7/26* (2018.01); *B32B 5/18* (2013.01); *B32B 7/06* (2013.01); *B32B 7/12* (2013.01); *B32B 27/40* (2013.01); *C09J 7/38* (2018.01); *B32B 2266/0278* (2013.01); *B32B 2405/00* (2013.01); *C09J 2301/1242* (2020.08); *C09J 2475/006* (2013.01); *Y10T 428/14* (2015.01)

(58) Field of Classification Search
CPC ........ C09J 7/26; C09J 7/38; C09J 2301/1242; C09J 2475/006; B32B 5/18; B32B 7/06; B32B 7/12; B32B 27/40; B32B 2266/0278; B32B 2405/00; Y10T 428/14
See application file for complete search history.

(56) References Cited

U.S. PATENT DOCUMENTS

| | | | | |
|---|---|---|---|---|
| 1,960,137 | A * | 5/1934 | Brown .................. | E04B 1/6812 428/317.1 |
| 4,169,184 | A * | 9/1979 | Pufahl ........................ | C09J 7/26 428/343 |
| 4,181,711 | A * | 1/1980 | Ohashi .................. | E04B 1/6812 428/95 |
| 4,356,676 | A * | 11/1982 | Hauptman ............ | E04B 1/6815 428/354 |
| 4,401,716 | A * | 8/1983 | Tschudin-Mahrer ....... | E01C 11/106 428/319.7 |
| 6,451,398 | B1 * | 9/2002 | Sylvester ................... | C09J 7/29 428/317.1 |

(Continued)

FOREIGN PATENT DOCUMENTS

WO 2007024246 A1 3/2007

OTHER PUBLICATIONS

Emseal Joint Systems, Ltd., Product Data Backerseal, Oct. 2020, 3 pages, Westborough, Massachusetts, USA.

(Continued)

*Primary Examiner* — Patricia L. Nordmeyer
(74) *Attorney, Agent, or Firm* — Crain, Caton & James, P.C.; James E. Hudson, III

(57) ABSTRACT

A laterally-coiled adhesively-retained low force backer for installation prior to application of a liquid sealant with sufficient surface adhesion to remain in place for such application and curing.

16 Claims, 2 Drawing Sheets

(56) References Cited

U.S. PATENT DOCUMENTS

| | | | |
|---|---|---|---|
| 8,147,955 B2 * | 4/2012 | Deib | E04B 1/6812 427/322 |
| 8,317,444 B1 | 11/2012 | Hensley | |
| 8,341,908 B1 | 1/2013 | Hensley et al. | |
| 8,365,495 B1 | 2/2013 | Witherspoon | |
| 8,739,495 B1 | 6/2014 | Witherspoon | |
| 8,813,449 B1 | 8/2014 | Hensley et al. | |
| 8,813,450 B1 | 8/2014 | Hensley et al. | |
| 8,870,506 B2 | 10/2014 | Hensley et al. | |
| 9,068,297 B2 | 6/2015 | Hensley et al. | |
| 9,200,437 B1 | 12/2015 | Hensley et al. | |
| 9,206,596 B1 | 12/2015 | Robinson | |
| 9,322,163 B1 | 4/2016 | Hensley | |
| 9,404,581 B1 | 8/2016 | Robinson | |
| 9,528,262 B2 | 12/2016 | Witherspoon | |
| 9,631,362 B2 | 4/2017 | Hensley et al. | |
| 9,637,915 B1 | 5/2017 | Hensley et al. | |
| 9,644,368 B1 | 5/2017 | Witherspoon | |
| 9,670,666 B1 | 6/2017 | Witherspoon et al. | |
| 9,689,157 B1 | 6/2017 | Hensley et al. | |
| 9,689,158 B1 | 6/2017 | Hensley et al. | |
| 9,739,049 B1 | 8/2017 | Robinson | |
| 9,739,050 B1 | 8/2017 | Hensley et al. | |
| 9,745,738 B2 | 8/2017 | Robinson | |
| 9,765,486 B1 | 9/2017 | Robinson | |
| 9,803,357 B1 | 10/2017 | Robinson | |
| 9,840,814 B2 | 12/2017 | Robinson | |
| 9,850,662 B2 | 12/2017 | Hensley | |
| 9,856,641 B2 | 1/2018 | Robinson | |
| 9,951,515 B2 | 4/2018 | Robinson | |
| 9,963,872 B2 | 5/2018 | Hensley et al. | |
| 9,982,428 B2 | 5/2018 | Robinson | |
| 9,982,429 B2 | 5/2018 | Robinson | |
| 9,995,036 B1 | 6/2018 | Robinson | |
| 10,000,921 B1 | 6/2018 | Robinson | |
| 10,060,122 B2 | 8/2018 | Robinson | |
| 10,066,386 B2 | 9/2018 | Robinson | |
| 10,066,387 B2 | 9/2018 | Hensley et al. | |
| 10,081,939 B1 | 9/2018 | Robinson | |
| 10,087,619 B1 | 10/2018 | Robinson | |
| 10,087,620 B1 | 10/2018 | Robinson | |
| 10,087,621 B1 | 10/2018 | Robinson | |
| 10,072,413 B2 | 11/2018 | Hensley et al. | |
| 10,125,490 B2 | 11/2018 | Robinson | |
| 10,179,993 B2 | 1/2019 | Hensley et al. | |
| 10,184,243 B2 | 1/2019 | Hamilton et al. | |
| 10,203,035 B1 | 2/2019 | Robinson | |
| 10,213,962 B2 | 2/2019 | Robinson | |
| 10,227,734 B1 | 3/2019 | Robinson | |
| 10,233,633 B2 | 3/2019 | Robinson | |
| 10,240,302 B2 | 3/2019 | Robinson | |
| 10,280,610 B1 | 5/2019 | Robinson | |
| 10,280,611 B1 | 5/2019 | Robinson | |
| 10,316,661 B2 | 6/2019 | Hensley et al. | |
| 10,323,360 B2 | 6/2019 | Robinson | |
| 10,323,407 B1 | 6/2019 | Robinson | |
| 10,323,408 B1 | 6/2019 | Robinson | |
| 10,323,409 B1 | 6/2019 | Robinson | |
| 10,352,003 B2 | 7/2019 | Robinson | |
| 10,352,039 B2 | 7/2019 | Robinson | |
| 10,358,777 B2 | 7/2019 | Robinson | |
| 10,358,813 B2 | 7/2019 | Robinson | |
| 10,385,518 B2 | 8/2019 | Robinson | |
| 10,385,565 B2 | 8/2019 | Robinson | |
| 10,407,901 B2 | 9/2019 | Robinson | |
| 10,422,127 B2 | 9/2019 | Hensley et al. | |
| 10,480,136 B2 | 11/2019 | Robinson | |
| 10,480,654 B2 | 11/2019 | Robinson | |
| 10,519,651 B2 | 12/2019 | Hensley et al. | |
| 10,533,315 B2 | 1/2020 | Robinson | |
| 10,533,316 B1 | 1/2020 | Robinson | |
| 10,538,883 B2 | 1/2020 | Robinson | |
| 10,544,548 B2 | 1/2020 | Robinson | |
| 10,544,582 B2 | 1/2020 | Hensley et al. | |
| 10,557,263 B1 | 2/2020 | Robinson | |
| 10,570,611 B2 | 2/2020 | Hensley et al. | |
| 10,584,481 B2 | 3/2020 | Robinson | |
| 10,676,875 B1 | 6/2020 | Robinson | |
| 10,787,805 B2 | 9/2020 | Hensley et al. | |
| 10,787,806 B2 | 9/2020 | Hensley et al. | |
| 10,787,807 B1 | 9/2020 | Robinson | |
| 10,787,808 B2 | 9/2020 | Robinson | |
| 10,794,011 B2 | 10/2020 | Robinson | |
| 10,794,055 B1 | 10/2020 | Robinson | |
| 10,794,056 B2 | 10/2020 | Hensley et al. | |
| 10,808,398 B1 | 10/2020 | Robinson | |
| 2014/0219719 A1 | 8/2014 | Hensley et al. | |
| 2014/0360118 A1 | 12/2014 | Hensley et al. | |
| 2015/0068139 A1 | 3/2015 | Witherspoon | |
| 2017/0130450 A1 | 5/2017 | Witherspoon | |
| 2017/0159817 A1 | 6/2017 | Robinson | |
| 2017/0191256 A1 | 7/2017 | Robinson | |
| 2017/0226733 A1 | 8/2017 | Hensley et al. | |
| 2017/0241132 A1 | 8/2017 | Witherspoon | |
| 2017/0254027 A1 | 9/2017 | Robinson | |
| 2017/0268222 A1 | 9/2017 | Witherspoon et al. | |
| 2017/0292262 A1 | 10/2017 | Hensley et al. | |
| 2017/0298618 A1 | 10/2017 | Hensley et al. | |
| 2017/0314213 A1 | 11/2017 | Robinson | |
| 2017/0314258 A1 | 11/2017 | Robinson | |
| 2017/0342665 A1 | 11/2017 | Robinson | |
| 2017/0342708 A1 | 11/2017 | Hensley et al. | |
| 2017/0370094 A1 | 12/2017 | Robinson | |
| 2018/0002868 A1 | 1/2018 | Robinson | |
| 2018/0016784 A1 | 1/2018 | Hensley et al. | |
| 2018/0038095 A1 | 2/2018 | Robinson | |
| 2018/0106001 A1 | 4/2018 | Robinison | |
| 2018/0106032 A1 | 4/2018 | Robinison | |
| 2018/0119366 A1 | 5/2018 | Robinison | |
| 2018/0142465 A1 | 5/2018 | Robinison | |
| 2018/0148922 A1 | 5/2018 | Robinson | |
| 2018/0163394 A1 | 6/2018 | Robinison | |
| 2018/0171564 A1 | 6/2018 | Robinison | |
| 2018/0171625 A1 | 6/2018 | Robinson | |
| 2018/0202148 A1 | 7/2018 | Hensley et al. | |
| 2018/0238048 A1 | 8/2018 | Robinison | |
| 2018/0266103 A1 | 9/2018 | Robinson | |
| 2018/0274228 A1 | 9/2018 | Robinson | |
| 2018/0300490 A1 | 10/2018 | Robinson | |
| 2018/0363292 A1 | 12/2018 | Robinson | |
| 2018/0371746 A1 | 12/2018 | Hensley et al. | |
| 2018/0371747 A1 | 12/2018 | Hensley et al. | |
| 2019/0057215 A1 | 2/2019 | Robinson | |
| 2019/0063608 A1 | 2/2019 | Robinson et al. | |
| 2019/0071824 A1 | 3/2019 | Robinson | |
| 2019/0107201 A1 | 4/2019 | Robinson | |
| 2019/0108351 A1 | 4/2019 | Robinson | |
| 2019/0194880 A1 | 6/2019 | Robinson | |
| 2019/0194935 A1 | 6/2019 | Robinson | |
| 2019/0211546 A1 | 7/2019 | Hensley et al. | |
| 2019/0242070 A1 | 8/2019 | Robinson | |
| 2019/0242117 A1 | 8/2019 | Robinson | |
| 2019/0242118 A1 | 8/2019 | Robinson | |
| 2019/0249420 A1 | 8/2019 | Robinson | |
| 2019/0249421 A1 | 8/2019 | Robinson | |
| 2019/0249422 A1 | 8/2019 | Robinson | |
| 2019/0249423 A1 | 8/2019 | Robinson | |
| 2019/0266335 A1 | 8/2019 | Robinson | |
| 2019/0271150 A1 | 9/2019 | Robinson | |
| 2019/0271151 A1 | 9/2019 | Robinson | |
| 2019/0323347 A1 | 10/2019 | Hensley et al. | |
| 2020/0018061 A1 | 1/2020 | Robinson | |
| 2020/0141067 A1 | 5/2020 | Robinson | |
| 2020/0141113 A1 | 5/2020 | Robinson | |
| 2020/0141114 A1 | 5/2020 | Hensley et al. | |
| 2020/0248411 A1 | 8/2020 | Robinson et al. | |
| 2020/0279046 A1 | 9/2020 | Robinson et al. | |

(56) References Cited

U.S. PATENT DOCUMENTS

2020/0325674 A1 10/2020 Robinson
2020/0325675 A1 10/2020 Robinson

OTHER PUBLICATIONS

Emseal Joint Systems, Ltd., Emseal MST, Oct. 2019, 2 pages, Westborough, Massachusetts, USA.
Emseal Joint Systems, Ltd., Emseal AST Hi-Acrylic, Mar. 2020, 2 pages, Westborough, Massachusetts, USA.

* cited by examiner

## LATERALLY-COILED ADHESIVELY-RETAINED LOW-FORCE BACKER FOR SEALANT APPLICATION

CROSS-REFERENCE TO RELATED APPLICATIONS

None.

STATEMENT REGARDING FEDERALLY SPONSORED RESEARCH OR DEVELOPMENT

Not Applicable.

BACKGROUND

Field

The present disclosure relates generally systems to support application of liquid between substrates during curing. More particularly, the present disclosure is directed to providing a laterally-coiled adhesively-retained low force backer to be installed prior to application of a liquid sealant with sufficient surface adhesion to remain in place for such application and curing.

Description of the Related Art

Building construction requires provision accommodating material responses to temperature fluctuations while providing a water-tight exterior. Construction panels come in many different sizes and shapes and may be used for various purposes, including roadways, sideways, tunnels and other pre-cast structures. To provide a seal against environmental contaminants, gunnable sealants are introduced into the space between adjacent substrates, insect intrusion, and liquids. However, the depth of these joints or gaps is typically substantially greater than the depth of the liquid sealant necessary to provide a seal.

Typically requiring a high in-field compression, the foam rod is positioned between adjacent substrates with a friction fit, due to back-pressure from the compressive fit (performed on installation), the backer rod provides a rear surface to retain penetration of a liquid sealant into the joint seal. The back rod is typically 3-5 times the expansion joint width.

Such backer bars were then maintained in position through friction and tension against the adjacent substrate. Once installed, the sealant was then applied to the joint, contacting both substrates at a depth reduced by the position of the backer bar.

The length of the rod continues to resist the compression and imposition into the expansion joint, increasing the time and effort required for imposition. The length of the rod further creates sizing issues and the rod must be cut to be no longer than the expansion joint, as additional length, in conjunction with the rigidity of the rod, requires the rod be cut to length, or shorter, prior to imposition. Rigidity and fixed length create impediments to installation.

After application of the sealant, these backer rods continue to resist compression and work against adjacent surfaces, including the sealant. As a result, the sealant may be worked loose from the rear side. The dynamic tension creates an impediment to use.

It would therefore be beneficial to provide a backer rod system which does not suffer from these impediments.

SUMMARY

The present disclosure therefore meets the above needs and overcomes one or more deficiencies in the prior art.

The present disclosure provides a laterally-coiled adhesively-retained low force backer having a body spirally coiled laterally about a vertical axis, a first pressure sensitive adhesive adhered to a body first side, a first pressure sensitive liner adhered to the first pressure sensitive adhesive, and a second pressure sensitive adhesive adhered to a body second side, the body second side opposite the body first side.

The present disclosure further provides a laterally-coiled adhesively-retained low force backer having a body where the body is resiliently compressible and elongate, has an uncompressed body width at a body top surface from a body first side to a body second side, and where the body has a body profile and a body length from a body first end to a body second end, a first pressure sensitive adhesive adhered to the body first side, a first pressure sensitive liner on a first pressure sensitive adhesive liner first side adhered to the first pressure sensitive adhesive, where the first pressure sensitive adhesive liner first side is opposite a first pressure sensitive adhesive liner second side, the first pressure sensitive adhesive liner extends from the body top surface to a body bottom surface from body first end to the body second end, a second pressure sensitive adhesive adhered to the body second side, where the first pressure sensitive adhesive is not identical to the second pressure sensitive adhesive, where the body is coiled about a vertical axis parallel to a body vertical axis from the body top surface to the body bottom surface and the first pressure sensitive adhesive liner second side contacts the body second side.

Additional aspects, advantages, and embodiments of the disclosure will become apparent to those skilled in the art from the following description of the various embodiments and related drawings.

BRIEF DESCRIPTION OF THE DRAWINGS

So that the manner in which the described features, advantages, and objects of the disclosure, as well as others which will become apparent, are attained and can be understood in detail; more particular description of the disclosure briefly summarized above may be had by referring to the embodiments thereof that are illustrated in the drawings, which drawings form a part of this specification. It is to be noted, however, that the appended drawings illustrate only typical preferred embodiments of the disclosure and are therefore not to be considered limiting of its scope as the disclosure may admit to other equally effective embodiments.

In the drawings.

DETAILED DESCRIPTION

The present disclosure provides a laterally-coiled adhesively-retained low force backer to be installed prior to application of a liquid sealant with sufficient surface adhesion to remain in place for such application and curing. The backer thus supports application of liquid between substrates during curing.

Figure 1:
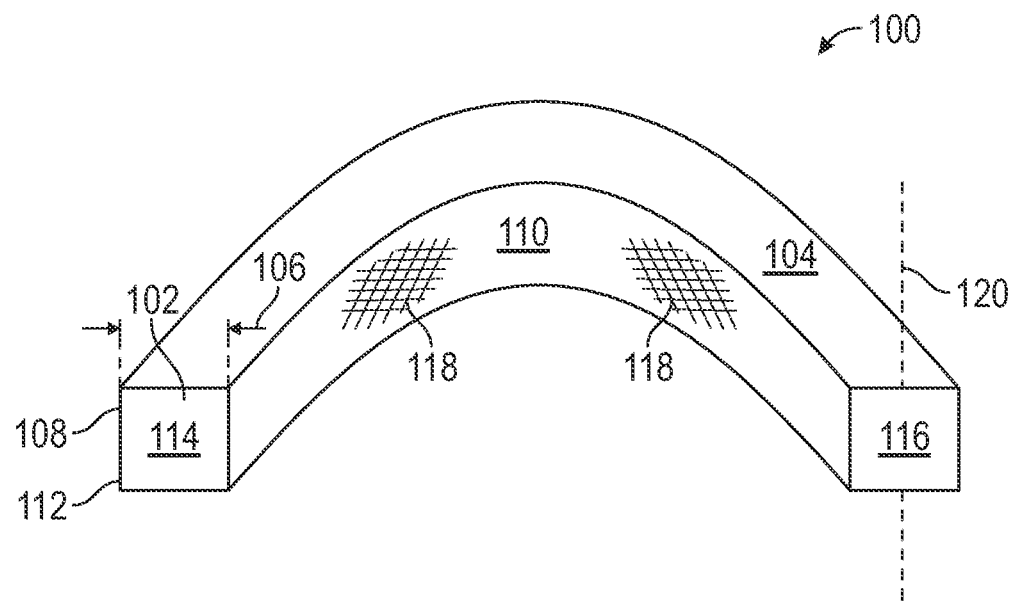
FIG. 1 provides an isometric view of the body of present disclosure prior to being coiled.
Figure 2:
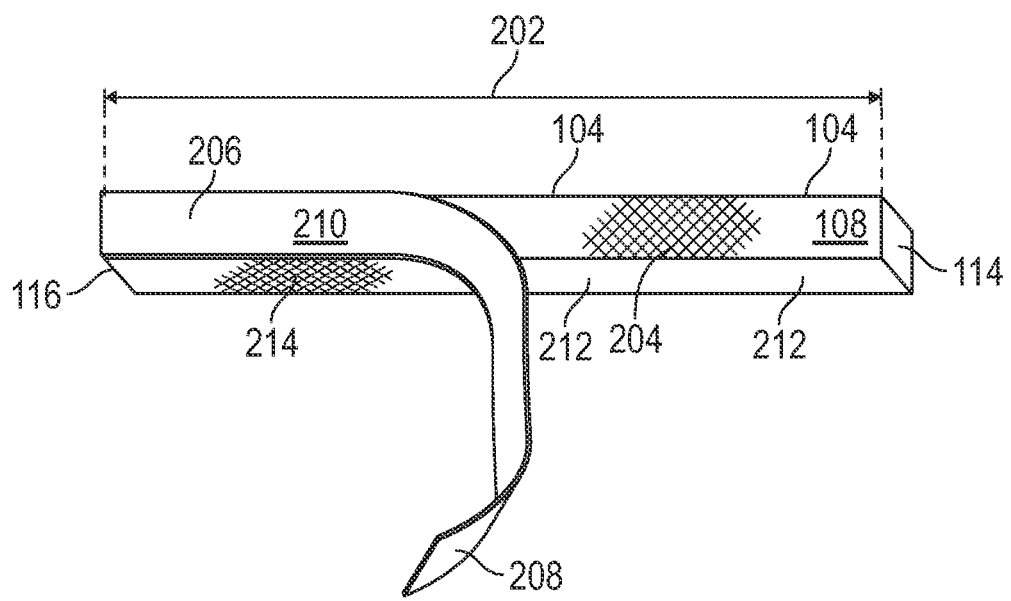
FIG. 2 provides an isometric view of the body of present disclosure prior to being coiled.
Figure 3:
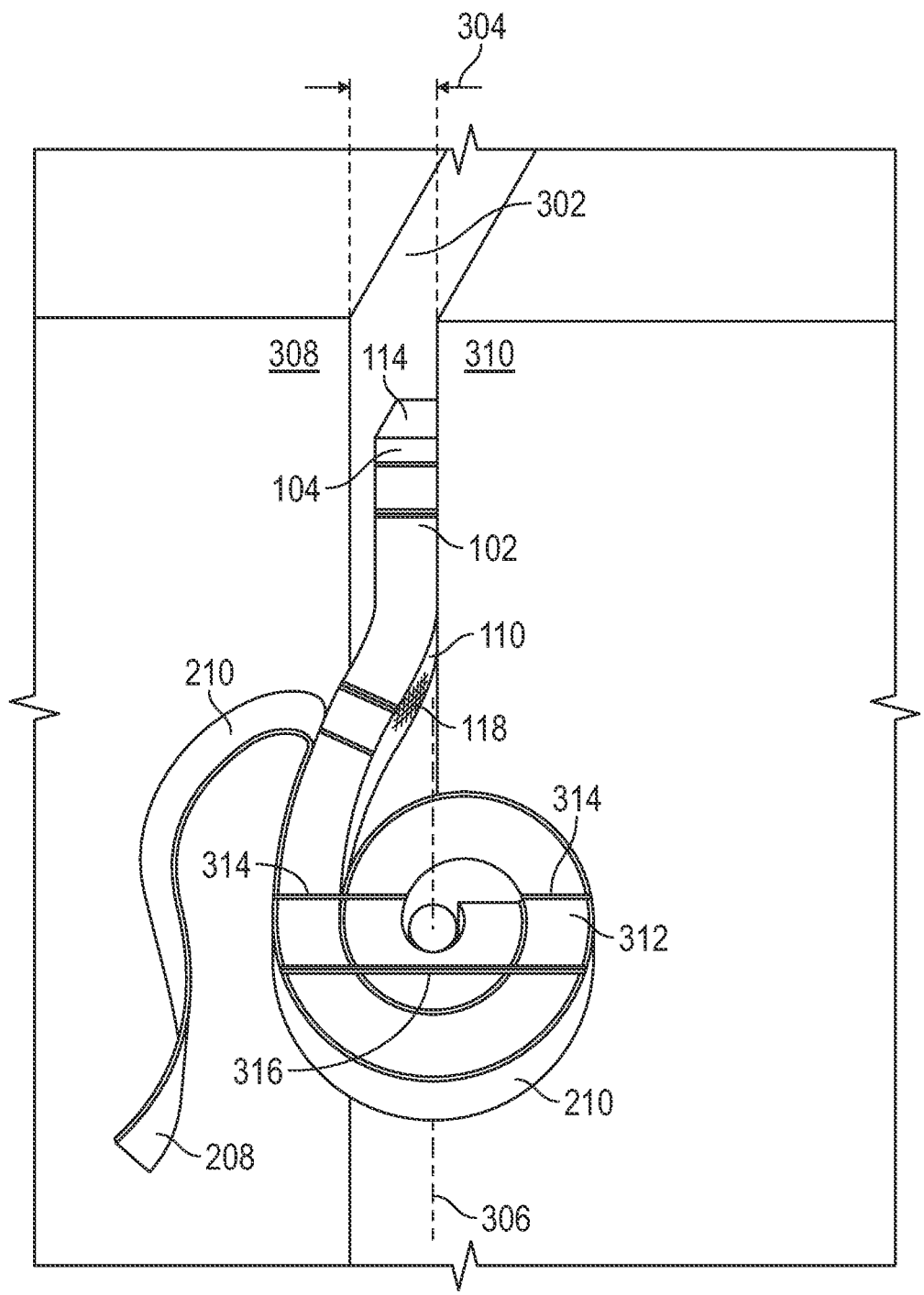
FIG. 3 provides an isometric view of the body of during installation.

Referring to FIG. 1, an isometric view of the body of present disclosure prior to being coiled is provided. Referring to FIG. 2, an isometric view of the body of present disclosure prior to being coiled is provided. Referring to FIG. 3, an isometric view of the body of during installation is provided, showing the body of the present disclosure as coiled.

Referring to FIGS. 1, 2 and 3, the backer 100 a body 102 spirally coiled laterally about a vertical axis 306, a first pressure sensitive adhesive 204 adhered to a body first side 108, a first pressure sensitive liner 206 adhered to the first pressure sensitive adhesive 204, and a second pressure sensitive adhesive 118 adhered to a body second side 110, where the body second side opposite the body first side 108. Each of the first pressure sensitive adhesive 204 and the second pressure sensitive adhesive 118 penetrates into the body 102, typically about 3 mils deep in an open foam structure. For a body 102 of an open cell foam, each of the first pressure sensitive adhesive 204 and the second pressure sensitive adhesive 118 is more than 3 mils thick.

The backer 100 has a body 102 which is resiliently compressible and elongate and may have an uncompressed body width 106 at a body top surface 104 from a body first side 108 to a body second side 110, where each side extends from the body top surface 104 to the body bottom surface 212. The body first side 108, body second side 110, body top surface 104 and body bottom surface 212 defined a body profile 112. The body 102 may have a body length 202 from a body first end 114 to a body second end 116.

The backer 100 has a first pressure sensitive adhesive liner 206 on a first pressure sensitive adhesive liner first side 208 adhered to the first pressure sensitive adhesive 204 where the first pressure sensitive adhesive liner first side 208 is opposite a first pressure sensitive adhesive liner second side 210, and where the first pressure sensitive adhesive liner 208 extends from the body top surface 104 to a body bottom surface 212 from body first end 114 to the body second end.

The backer 100 further has a second pressure sensitive adhesive 118 adhered to the body second side 110, where the first pressure sensitive adhesive 204 is not identical to the second pressure sensitive adhesive 118, The body 102 is coiled about a vertical axis 306, where the vertical axis 306 is parallel to a body vertical axis 120 from the body top surface 104 to the body bottom surface 212, so the first pressure sensitive adhesive liner second side 210 contacting the body second side 110.

The body 102 is preferably open-celled and may be polyurethane. Thus, the body 102 is composed entirely of an open-celled polyurethane foam. When foam is used, it is preferably open celled, but may be closed celled when desired. The body 102 may be homogenous foam or may be altered by introduction of fillers, fire retardants, water retardants and other additives. When used, the additive may be one or more of a fire-retardant material, a water-retardant material, an insect-repelling material, and aluminum trihydrate.

When the body 102 is a foam, it may be selected to have one or more relaxation or expansion rates, for example such that the foam expands at a rate of 12 inches/minute for the first five seconds. Where the foam has an uncompressed body width less than 5 inches, the body 102 is selected to continue to expand to at least 95% of maximum expansion. The selected expansion rate is substantially higher than foam with an impregnation, such as those to increase fire retardancy and those used as fillers. This ensures that in the absence of high compression necessary for a friction/compression fit, the backer 100 expands sufficiently fast for an adhesive bond to make to the substrate and therefore maintain the backer 100 is place, such that the backer 100 does not rely on backpressure exerted by the body 102 to stay in place and instead relies on one or both of the first pressure sensitive adhesive 204 and the second pressure adhesive 118. The expansion rate may be adjusted or altered, such as to accommodate purpose and environment. This may include applying an adhesive 314 to one of both of the body top surface 104 or body bottom surface 212 to restrict lateral expansion. Alternatively or additionally, one or more rows of one or more elastomers 316 may be applied across the lateral coil 312 to the body top surface 104 or body bottom surface 212 to intermittently or repeatedly constrain the expansion rate of the body 102 at locations along the length 202 of the body 102. Further, one or both of the body top surface 104 or body bottom surface 212 may be surfaced, such as by application of a surface treatment, material, damaging, or heating to generate a skin 214 with a lower expansion rate than the body 102, slowing the expansion at the body top surface 104 or body bottom surface 212.

The body 102 may be selected to have a compressibility in the range of 0% to 95%. Compressibility is a material function and identifies the change in volume in response to application of force over area (pressure). Isothermal compressibility is the negative of the inverse of the volume times (the difference in volume divided by the difference in pressure). As a result, the compressibility, as applied by the body 102 across each of the body first side 108 and the body second side 110, causes a force in the range of 0.2-0.60 pounds per square inch on the first substrate 308 and the second substrate 310. Fillers and/or fire retardant materials may be included in the body 102 provided the body 102 has a compressibility in the range of 0% to 95%.

Likewise, the body 102 may have a flexural strength sufficient to facilitate bending of the backer 100, particularly by coiling the backer 100 and by uncoiling the backer 100 upon demand, avoiding the situation of a backer rod being too long for the joint 302.

Rather than using friction to maintain position, the backer 100 uses a body first side 108 and/or a body second side 110, each with a pressure sensitive adhesive, to adhere to the first substrate 308 and/or the second substrate 310 and to maintain position with minimal tension. Moreover, because the first pressure sensitive adhesive 204 and the second pressure sensitive adhesive 118 are not identical, i.e. different or dissimilar, attachment is made to at least one of the first substrate 308 and the second substrate 310 across different environmental regimes and for different substrate materials. The first pressure sensitive adhesive 204 and the second pressure sensitive adhesive 118 may be selected from known compositions, including hot melts, acrylics, glues, gums, glues (which may be liquid or in sticks), epoxies, spray adhesives, fabric adhesives, and polyurethane adhesives. When the first pressure sensitive adhesive 204 and the second pressure sensitive adhesive 118 are applied to the body 102, to some extent each penetrates somewhat into the body 102.

The body 102 may be selected to have a density of 1.25-1.87 lb/ft$^3$ (20-30 kg/m$^3$) before compression and may be selected so the body has a compression set property at 50% compression from a mean joint size measured according to ASTM D3574-17 Test D of not more than 10. However, higher ranges are possible. The body 102 may be selected to have a density of at least 1.25 (20 kg/m$^3$) and not more than 18.75 lb/ft$^3$ (300 kg/m$^3$). Preferably when relaxed, and prior to any compression, the body 102 has a density of less 25 lb/ft$^3$ (400 kg/m$^3$). When desired, the body 102 may be adapted to provide a density of 1.87-2.81 lb/ft$^3$ (30-45 kg/m$^3$) while contacting the first substrate 308 and the second substrate 308 or may be adapted to provide a density of 1.56-6.12 lb/ft³ (25-98 kg/m³) while contacting the first substrate 308 and the second substrate 310.

When the body 102 is composed of a foam, the foam may be selected to have an air flow property measured according to ASTM D3574-17 Test G of at least 1 Cubic Feet per Minute (CFM) (0.028 m³/min) and not more than 2 CFM (0.057 m³/min). Air flow is a measure of cross-linking or for the flexible foam of the instant invention, the lack of cross-linking. ASTM D3574 was written based upon "The Dow Machine," as the term is used in the cellular foam materials industry. The Dow Machine is no longer produced. Generally, this refers to the volume of air which passes through a 1.0 inch (2.54 cm) thick section of foam measuring 2 inches (5.08 cm) by 2 inches (5.08 cm) square at 0.018 psi (125 Pa) of pressure. Units are expressed in cubic decimeters per second and converted to standard cubic feet per minute. This measurement follows ASTM D 3574 Test G.

When the body 102 is foam, it may have a 25% IFD value in the range of 44-52 lbs, per ASTM D3574 Test B1, though the range may be a broad as 40-60 lbs. IFD measures the load required to depress a 50 square inch compression platen into a polyurethane foam specimen. These mechanical properties are influenced by the thickness and size of the sample. In essence, IFD measures firmness.

The body 102 may also have a tensile strength of at least 10 psi, per ASTM D3574 Test B1, though higher and lower surrounding values are also acceptable. Tensile strength of at least 10 psi ensures the body 102 can be installed without fracturing, particularly when provided on a coil which requires the body 102 to flex when uncoiling.

The body 102 may also have an elongation value, per ASTM D3574 Test B1, of at least 100. The ASTM D3574 Test B1 Elongation value is the percent that a specially shaped sample will stretch from its original length before tearing or breaking. Expressed as a percentage, this test is used to measure the length of stretch in a material before it breaks. With a value of 80-120, a preferred range, the body 102 will elongate substantially before any failure occurs. However, because the body 102 is rubbery, when stretched, the body 102 becomes narrower, avoiding increased pressure on the substrate walls.

Because the body 102 serves only for the time necessary to apply the sealant, tear resistance and strength can be quite low.

As a result of relaxation rate and the use of pressure sensitive adhesives rather than reliance on high compression, the uncompressed body width 106 may be equal to the intended joint width 304 or may be a low multiple of it, such as the uncompressed body width 106 being not greater than four times the joint width 306. When installed, the body may be uncompressed or may be imposed under some compression to aid the adhesive in bonding to the substrate. When desired, the compression ratio may compress the foam up to one-fourth of its original width, i.e. a 4:1 ratio. Compression ratios of 2:1 or even 3:1 are possible. The body may be impressed into the joint at a 1.5:1 ratio. Because the backer is maintained in position with adhesive on one or both surfaces, rather than friction, the compression may be low, such as 1.2:1. The backpressure associated with friction and higher compression is therefore not required.

Because the body 102 is coiled laterally about the vertical axis 306, the portion of the body 102 adjacent the body second side 110 is somewhat compressed. As the first pressure sensitive adhesive liner first side 208 is opposite a first pressure sensitive adhesive liner second side 210, when the body 102 is coiled, the first pressure sensitive adhesive liner second side 210 contacts the body second side 110. Thus, when uncoiled, only one surface requires an adhesive liner, rather than one on each side. To facilitate the coiling, the body length 202 is substantially greater than the uncompressed body width 106. A ratio of 10:1 may be considered a minimum, though downward departures are permissible More likely the ratio may be at least 120:1. As a result, the coil of the body 102 is horizontal, not vertical, during application. Beneficially, this spiral coiled body 102 provides an increase in ease of installation and in safety. Rather than requiring a bag of backer rods of a short length, installers manage the lateral coil 312. Beneficially, by being horizontally-coiled rather than vertically-coiled, the coil 312 does not obscure observation of the expansion joint 302. Moreover, when desired, this lateral coil can be incorporated in a a mechanical application device, such as a dispenser or installation robot.

Where desired, the relaxation rate of the body 102 may be slowed by inclusion of fillers, fire retardants, insect repellents, and/or one or both of the first pressure sensitive adhesive 204 and the second pressure sensitive adhesive 118 at a greater depth into the body 102. These materials may be impregnated, put into, infused, or otherwise introduced into the body 102. The additive may therefore be introduced into the body 102 by one of the processes selected from the group of impregnation, infusion, and injection. The entirety of the body 102 need not be penetrated across the uncompressed body width 106 as only a portion of the body 102 needs to support the added material to slow the relaxation rate for the entirety of the body 102. Because fillers and the like may be avoided or reduced, the expansion rate may be retained at a relatively high value sufficient to provide a fast expansion rate and therefore ready contact of the pressure sensitive adhesive to the associated substrate and therefore the retention in place, facilitating a fast installation.

The first pressure sensitive adhesive 204 may be put into the body 106 at the body first side 108 by compressing the body 106 and applying the first pressure sensitive adhesive 204 from the first side 108. The extent of penetration may be a small percentage of the uncompressed body width 106, such as 10%, or may be a greater percentage, such as 33%. When desired, the first pressure sensitive adhesive 204 may penetrate the entire uncompressed body width 106, functioning as a filler, provided the first pressure sensitive adhesive 204 does not preclude the second pressure sensitive adhesive 118 from adhering to the body second side 110. Additional, or alternatively, the second pressure sensitive adhesive 118 may be likewise be put into the body 106.

Moreover, neither the first pressure sensitive adhesive 204 nor the second pressure sensitive adhesive 118 needs to be continuously applied, though a continuous application of one or both is possible. Either the first pressure sensitive adhesive 204 or the second pressure sensitive adhesive 118 may be applied at regular intervals, so as to be present intermittently on the applicable body first side 108 and body second side 110. While a continuous application of either the first pressure sensitive adhesive 204 or the second pressure sensitive adhesive 118 increases the contact surface and therefore ease installation, a regular, intermittent application may be used to avoid an undesirable lowering of the expansion rate or encumbering adhesive, particularly on the body second side 110 as no release liner accompanies the body 102 on the body second side 110 during installation.

One or both of the body first side 108 and the body second side 110 may be provided with a flat surface. The profile 112 may be a quadrilateral. Other surfaces, such as curved or multiple surfaces, may be used. Preferably, the body first side 108 and the body second side 110 include surfaces parallel to the first substrate 308 and the second substrate 310, increasing the surface area in contact. Other polygonal shapes may be used to include chamfers adjacent the body top surface 104 or the body bottom surface 212 to have a reduced width at imposition. Unlike the prior art, round backers are to be avoided as they fail to provide adequate contact surfaces.

The foregoing disclosure and description is illustrative and explanatory thereof. Various changes in the details of the illustrated construction may be made within the scope of the appended claims without departing from the spirit of the invention. The present invention should only be limited by the following claims and their legal equivalents.

We claim:

1. A laterally-coiled adhesively-retained low-force backer for sealant application, comprising:
    a body spirally coiled laterally about a vertical axis,
    a first pressure sensitive adhesive adhered to a body first side,
    a first pressure sensitive liner adhered to the first pressure sensitive adhesive,
    a second pressure sensitive adhesive adhered to a body second side, the body second side opposite the body first side, and
    a row of a material selected from the group consisting of an adhesive and an elastomer, the row applied across the coiled body to one of the group consisting of a coiled body top surface and a coiled body bottom surface;
    wherein the row is configured to constrain an expansion rate of the body at a plurality of locations along a body length of the body.

2. A laterally-coiled adhesively-retained low-force backer for sealant application, comprising:
    a body,
        the body being resiliently compressible and elongate,
        the body having an uncompressed body width at a body top surface from a body first side to a body second side, and
        the body having a body profile and a body length from a body first end to a body second end;
    a first pressure sensitive adhesive adhered to the body first side;
    a first pressure sensitive liner on a first pressure sensitive adhesive liner first side adhered to the first pressure sensitive adhesive,
        the first pressure sensitive adhesive liner first side opposite a first pressure sensitive adhesive liner second side, and
        the first pressure sensitive adhesive liner extending from the body top surface to a body bottom surface from body first end to the body second end;
    a second pressure sensitive adhesive adhered to the body second side,
        the first pressure sensitive adhesive not identical to the second pressure sensitive adhesive; and
    the body coiled about a vertical axis,
        the vertical axis parallel to a body vertical axis from the body top surface to the body bottom surface, and
        the first pressure sensitive adhesive liner second side contacting the body second side, and
    a row of a material selected from the group consisting of an adhesive and an elastomer, the row applied across the coiled body to one of the group consisting of a coiled body top surface and a coiled body bottom surface;
    wherein the row is configured to constrain an expansion rate of the body at a plurality of locations along the body length.

3. The laterally-coiled adhesively-retained low-force backer for sealant application of claim 2, wherein the body is composed entirely of an open-celled polyurethane foam.

4. The laterally-coiled adhesively-retained low-force backer for sealant application of claim 3, wherein the foam has a compressibility in the range of 0 to 95%.

5. The laterally-coiled adhesively-retained low-force backer for sealant application of claim 3, wherein the first pressure sensitive adhesive is selected from the first pressure sensitive additive group consisting of hot melts, acrylics, glues, gums, epoxies, spray adhesives, fabric adhesives, and polyurethane adhesives.

6. The laterally-coiled adhesively-retained low-force backer for sealant application of claim 3, wherein the second pressure sensitive adhesive is selected from the second pressure sensitive additive group consisting of hot melts, acrylics, glues, gums, glue sticks, epoxies, spray adhesives, fabric adhesives, and polyurethane adhesives.

7. The laterally-coiled adhesively-retained low-force backer for sealant application of claim 3, wherein the foam has a density of 1.25-1.87 lb/ft$^3$ (20-30 kg/m$^3$) uncompressed.

8. The laterally-coiled adhesively-retained low-force backer for sealant application of claim 3, wherein the foam has a compression set property at 50% compression from a mean joint size measured according to ASTM D3574-17 Test D of not more than 10.

9. The laterally-coiled adhesively-retained low-force backer for sealant application of claim 3, wherein the foam is compressed to a density of 1.56-6.12 lb/ft$^3$ (25-98 kg/m$^3$).

10. The laterally-coiled adhesively-retained low-force backer for sealant application of claim 9, wherein the foam has an air flow property measured according to ASTM D3574-17 Test G of at least 1 Cubic Feet per Minute (CFM) (0.028 m$^3$/min) and not more than 2 CFM (0.057 m$^3$/min).

11. The laterally-coiled adhesively-retained low-force backer for sealant application of claim 10, wherein the foam has a 25% IFD value in the range of 40-60 lbs, per ASTM D3574 Test B1.

12. The laterally-coiled adhesively-retained low-force backer for sealant application of claim 11, wherein the foam has a tensile strength of at least 10 psi, per ASTM D3574 Test B1.

13. The laterally-coiled adhesively-retained low-force backer for sealant application of claim 12, wherein the foam has an elongation value, per ASTM D3574 Test B1, of at least 100.

14. The laterally-coiled adhesively-retained low-force backer for sealant application of claim 2, wherein the body is composed of an open-celled foam and an additive selected from the additive group consisting of a fire-retardant material, a water-retardant material, an insect-repelling material, and aluminum trihydrate.

15. The laterally-coiled adhesively-retained low-force backer for sealant application of claim 14, wherein the additive is introduced into the open-celled celled foam by one of the processes selected from the group of impregnation, infusion, and injection.

16. The laterally-coiled adhesively-retained low-force backer for sealant application of claim 2, wherein one of the group consisting of the body top surface and the body bottom surface has a surface treatment.

* * * * *